(12) United States Patent
Banerjee et al.

(10) Patent No.: US 8,792,384 B2
(45) Date of Patent: Jul. 29, 2014

(54) SYSTEM AND METHOD FOR INTELLIGENTLY MAINTAINING CONNECTIVITY IN A NETWORK ENVIRONMENT

(75) Inventors: Ayan Banerjee, Fremont, CA (US); Veena Raghavan, Fremont, CA (US); Abhay Roy, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 378 days.

(21) Appl. No.: 13/032,444

(22) Filed: Feb. 22, 2011

(65) Prior Publication Data

US 2012/0213117 A1 Aug. 23, 2012

(51) Int. Cl.
*H04L 12/28* (2006.01)

(52) U.S. Cl.
USPC ............................ 370/254; 709/249; 709/202

(58) Field of Classification Search
USPC .................................. 370/254; 709/204, 202
See application file for complete search history.

(56) References Cited

U.S. PATENT DOCUMENTS

2009/0037607 A1* 2/2009 Farinacci et al. ............. 709/249

OTHER PUBLICATIONS

Cisco system, Inc. "Introduction to intermediate sysytem-to-intermediate system protocol" published 1992-2005; 25 pages.*
U.S. Appl. No. 13/629,600, entitled "System and Method for Maintaining Connectivity in a Single-Hop Network Environment," filed Sep. 27, 2012; Inventors: Ayan Banerjee, et al.
"Information technology—Telecommunications and information exchange between systems—Intermediate System to Intermediate System intra-domain routeing information exchange protocol for use in conjunction with the protocol for providing the connectionless-mode network service," International Standard ISO/IEC 10589, Nov. 15, 2002; 210 pages.
"Introduction to Intermediate System-to-Intermediate System Protocol," Cisco Systems, Inc., 2002; 25 pages.
"IS-IS" from Wikipedia, the free encyclopedia, Jun. 19, 2012; 3 pages http://en.wikipedia.org/w/index/php?title=IS-IS&oldid=498404709.
"Understanding IS-IS Pseudonode LSP," Document ID: 49627, Cisco Systems, Inc., Aug. 10, 2005; 8 pages.
Lapukhov, Petr, "What is Overlay Transport Virtualization?" INE.com, Feb. 15, 2010, http://blog.ine.com/2010/02/15/what-is-overlay-transport-virtualization/.
Cisco Systems, Inc., "Cisco Nexus 7000 Series NX-OS OTV Configuration Guide, Release 5.x," First Published Jul. 6, 2010; Last Modified Oct. 26, 2010; 56 pages; http://www.cisco.com.
"4.4. Designated Routers," [retrieved and printed Feb. 1, 2011]; 12 pages; http://fengnet.com/book/ospfandisis/ch04lev1sec4.html.
Cisco Systems, Inc. "Introduction to Intermediate System-to-Intermediate System Protocol," © 1992-2002; 25 pages; http://www.cisco.com/en/US/products/ps6599/products_white_paper09186a00800a3e6f.shtml#wp39303.
Joseph M. Soricelli, et al., "Certified Internet Associate: Study Guide—Chapter 7," Juniper Networks, Inc., © Jun. 2003; 46 pages; http://kb.juniper.net/kb/documents/public/junos/StudyGuides/Ch7_from_JNCIA_studyguide.pdf.

* cited by examiner

*Primary Examiner* — Dang Ton
*Assistant Examiner* — Mewale Ambaye
(74) *Attorney, Agent, or Firm* — Patent Capital Group

(57) ABSTRACT

A method is provided in one example embodiment and includes establishing a communication pathway between a first network node and a second network node coupled to a network; forming an adjacency to a new network node coupled to the network, where a designated intermediate system (DIS) election operation is executed after the adjacency is formed in order to determine that the new network node is a newly identified DIS for the network; and communicating a message advertising connectivity to both a previously identified DIS and the newly identified DIS, where the message is communicated during a specified time interval.

20 Claims, 6 Drawing Sheets

SYSTEM AND METHOD FOR INTELLIGENTLY MAINTAINING CONNECTIVITY IN A NETWORK ENVIRONMENT

TECHNICAL FIELD

This disclosure relates in general to the field of communications, and more particularly, to a system and a method for intelligently maintaining connectivity in a network environment.

BACKGROUND

Networking architectures have grown increasingly complex in communications environments. Data traffic has grown extensively in recent years, which has significantly increased the demands on network resources and devices. Certain routing protocols have added a layer of complexity to connectivity in the network. As the subscriber base of end users increases, efficient management of communication resources becomes even more critical. In some instances, as new information propagates in the network, windows of information become inconsistent. Such windows may result in disruptions for network traffic, or the dropping of certain traffic flows due to inaccurate routing information amongst network nodes. Hence, there is a significant challenge in maintaining accurate connectivity data in a network environment.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes establishing a communication pathway between a first network node and a second network node coupled to a network; forming an adjacency to a new network node coupled to the network, where a designated intermediate system (DIS) election operation is executed after the adjacency is formed in order to determine that the new network node is a newly identified DIS for the network; and communicating a message advertising connectivity to both a previously identified DIS and the newly identified DIS, where the message is communicated during a specified time interval.

In more specific implementations, the first network node is configured to execute a shortest path first (SPF) operation in order to reach both the previously identified DIS and the newly identified DIS. Additionally, the first network node can synchronize to a link state database associated with the newly identified DIS. In yet other implementations, the newly identified DIS purges a pseudo-node link state protocol data unit (LSP) and generates its own LSP.

After the specified time interval, the first network node advertises connectivity only to the newly identified DIS. The time interval can be based on a hello message parameter and a communication parameter, which can be associated with interacting with all nodes coupled to a local area network (LAN). Additionally, the time interval can be factored based on a high-loss characteristic of the network. In more specific implementations, the network is an overlay transport virtualization (OTV) LAN network in which the first network node executes an intermediate system to intermediate system (IS-IS) protocol in a control plane.

Example Embodiments

Figure 1:
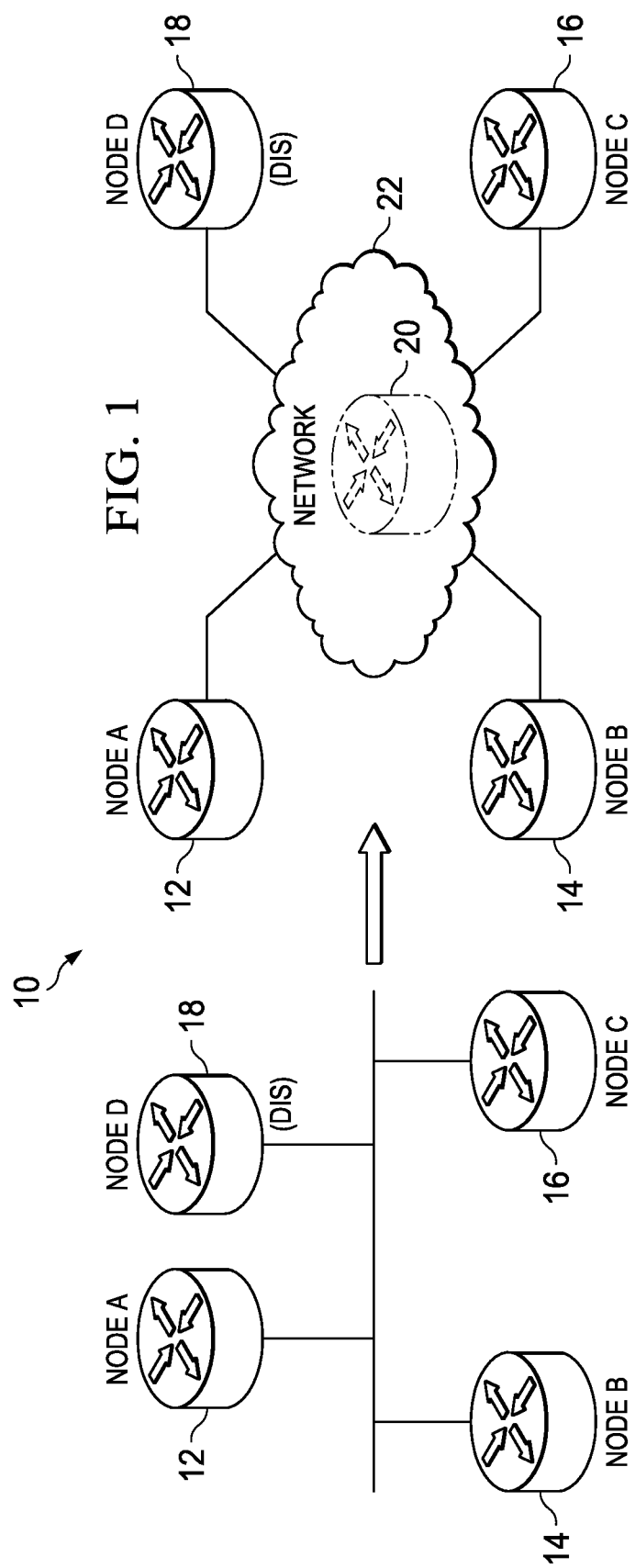
FIG. 1 is a simplified block diagram illustrating a communication system for intelligently maintaining connectivity in a network environment according to one embodiment of the present disclosure.

Turning to FIG. 1, FIG. 1 is a simplified block diagram illustrating a communication system 10 associated with maintaining layer-2 connectivity in a network environment. Communication system 10 may include a plurality of nodes 12, 14, 16, and 18 (that are labeled nodes A-D respectively). Also depicted in FIG. 1 is a network 22, which can be representative of a public switched telephone network (PSTN) in which a single node 20 can offer connectivity to the surrounding nodes. Network 22 can serve as a transport mechanism for data that propagates between the nodes.

In this particular implementation, a local area network (LAN) couples nodes A-D to each other, where a single designated intermediate system (DIS) is indicated for node D. In general terms, FIG. 1 is depicting the evolution of a network system that is associated with an overlay network. An overlay network typically offers layer-2 connectivity between remote sites over a transport network. The overlay network can include one or more edge devices on each site interconnected with a control plane protocol across a transport network. Each site consists of one or more edge devices, as well as other internal routers, switches, or servers. Hence, two sites can be connected through edge devices to a transport network (e.g., to create a virtual overlay network).

In a particular application, communication system 10 can be applied to an Overlay Transport Virtualization (OTV) scenario in which multiple edge boxes across layer-2 (L2) sites communicate with each other via a layer-3 (L3) or an L2 cloud using an intermediate system to intermediate system (IS-IS) protocol in the control plane. Logistically, the OTV-IS-IS control network has special inherent properties; for example, it is a single hop LAN network. An overlay network maps media access control (MAC) addresses to Internet protocol (IP) addresses of the edge devices. Once the OTV framework identifies the correct edge device to which to send a layer-2 frame, OTV encapsulates the frame and, subsequently, sends the resulting IP packet using transport network routing protocols. In common implementations, OTV supports one or more separate overlay networks, where each overlay network can support one or more virtual LANs (VLANs).

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. Communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

Before detailing the operations and the infrastructure of FIG. 1, certain contextual information is provided to offer an overview of some problems that may be encountered while maintaining connectivity in a network environment. Such information is offered earnestly and for teaching purposes only and, therefore, should not be construed in any way to limit the broad applications for the present disclosure.

In the most general terms, the idea behind the DIS is similar to that of the designated router in the Open Shortest Path First (OSPF) protocol. The DIS creates a pseudo-node (i.e., a virtual node), where routers on a LAN (including the DIS) form an adjacency with the pseudo-node instead of forming a customary n*(n−1) order adjacencies with each other in a full mesh.

In operation, and in the context of a LAN environment, one of the routers elects itself the DIS based on interface priority (e.g., the default being 64). If all interface priorities were the same, the router with the highest sub-network point of attachment (SNPA) would be selected. MAC addresses are the SNPA on LANs. On Frame Relay networks, the local data-link connection identifier (DLCI) is the SNPA. If the SNPA is a data-link connection identifier (DLCI) and is the same at both sides of a link, the router with the higher system ID (in the network service access point (NSAP) address) would become the DIS. A pseudo-node link state protocol data unit (PDU) (LSP) represents a LAN, including all intermediate systems (ISs) attached to that LAN, just as a non-pseudo-node LSP represents a router, including all ISs and LANs connected with the router.

The DIS election is commonly preemptive (unlike with OSPF model). If a new router boots on the LAN with a higher interface priority, it becomes the DIS, it purges the old pseudo-node LSP, and a new set of LSPs would be flooded. If a router needs an LSP because it is older than the LSP advertised by the DIS in its complete sequence number PDU (CSNP), or because it is missing an LSP that is listed in the CSNP, it will send a partial sequence number PDU (PSNP) to the DIS and, subsequently, receive the LSP in return.

The OTV paradigm builds L2 reachability information by communicating between edge devices with the overlay protocol. The overlay protocol can form adjacencies with all edge devices. Once each edge device is adjacent to all its peers on the overlay, the edge devices can share MAC address reachability information with other edge devices that participate in the same overlay network.

Typically, in an IS-IS LAN network scenario, one of the routers elects itself as the DIS based on a standard algorithm (e.g., such as that which is defined in specifications that describe the IS-IS protocol). The DIS election is preemptive; if a new router boots up on the LAN with a higher interface priority or a higher system ID, it becomes the DIS. The DIS helps to reduce the amount of data in a given link-state database and, further, it aids in the processing of the shortest path first (SPF) calculation. A pseudo-node can advertise the neighbor relationships of all routers in its database update, where the actual nodes can advertise a relationship with only the pseudo-node. When a pseudo-node is introduced on the link, routers only advertise a relationship to that particular node.

The DIS election process (e.g., whenever a LAN Hello message is received) means that if a Hello message being received has a higher priority than the existing DIS (or a higher MAC address if the priority is equal to the DIS priority), the originator of the Hello becomes the DIS. When the DIS is preempted (or when it resigns by lowering its priority to be below that of another router on the link), the new DIS purges the pseudo-node link state protocol data units (PDUs) (LSPs). The new DIS then originates its own LSP, and all other routers synchronize to the new DIS's link state database. In a typical implementation, after the DIS election completes, and there is a change in the DIS on the LAN, all nodes would run an SPF algorithm.

Since nodes run DIS and SPF in a distributed fashion, it is expected that there may be small windows during which existing traffic flows may be affected. Hence, in a single hop LAN network, where IS-IS is used as the interior gateway protocol (IGP), there is a small vulnerable window during which a new node is introduced into the network. In certain instances, this new node will eventually be elected as the DIS; however, traffic flows can be disrupted in the intervening interim.

Consider an example in which there are two nodes in the LAN: node A and node B (with node A being the DIS initially). Furthermore, and for ease in explanation, assume that LSPs that are generated have the following LSP-IDs: A-00-00, B-00-00, and the pseudo-node LSP A-01-00. In the OTV network, MAC information that is announced within LSP fragments A-00-00 and B-00-00 are used to maintain traffic flows between members and between hosts behind OTV edge devices (i.e., nodes A and B). If a node C joins this overlay network, and if it does not become the DIS of this LAN, then no issues are presented for the network (e.g., in terms of maintaining existing traffic flows).

If an assumption is made that node C will eventually be the DIS, then a certain vulnerability occurs in the network. In such an instance, the LSPs in steady state (after the DIS election completes and after the LSPs are generated) are A-00-00, B-00-00, C-00-00, and C-01-00. The LSP fragments (A-00-00, B-00-00, etc. in this example) can show connectivity to the pseudo-node LSP (C-01-00) and vice versa. If nodes A and B run the SPF algorithm before receiving the final pseudo-node (LSP C-01-00) that does not list both of them (i.e., A-00 and B-00), then connectivity between them would be lost. As a result, traffic is dropped, which creates performance issues for network operators. In general, there can be unaccounted for nodes in the LAN with traffic flowing between them. If the distributed SPFs are run before the pseudo-node LSP is generated with the complete connectivity information, this will negatively impact existing traffic flows.

In certain example embodiments, communication system 10 is configured to overcome the aforementioned shortcomings (and others) by ensuring that SPF does not incur a loss of connectivity while the final steady state LSPs are generated. Specifically, communication system 10 is configured to perform a graceful migration of pseudo-node LSPs in the OTV-IS-IS control plane. In essence, existing traffic flows can be suitably maintained without dropping packets during transition scenarios. Logistically, existing traffic flows are not disrupted while new members join an OTV overlay. Without such a mechanism, in the event a member is designated as the DIS, there is a high probability of traffic disruption in the OTV framework. In contrast to such undesirable consequences, communication system 10 offers a seamless migration of current routing information, which results in minimal (or no) disturbances in the network.

In specific implementations, the time window (during which other nodes discover node C of the above example) is significant to the operational aspects of communication system 10. In the single-hop OTV-IS-IS LAN network, upon discovering a new node in the network (node C in the above example), both nodes A and B can run a DIS election algorithm: once adjacency is completely established with this new node. It is expected that there could be skew of (at most) one Hello interval (e.g., T1) between these events. A timing assumption can be made (e.g., T2 seconds) associated with node C generating the pseudo-node LSP (that shows the connectivity to all members in the LAN), and also reaching all members with this LSP.

Hence, there is a period of vulnerability of T1+T2 seconds in which a graceful migration of the DIS can occur. One aspect of communication system 10 ensures that the older pseudo-node LSP (and the connectivity to it from the members in the LAN) remains intact for a time period of T1+T2 seconds. During this time period, the older connectivity and the "new" connectivity that is being built can coexist in parallel. In most cases, this time interval T1+T2 is sufficient to maintain existing traffic flows. During this time period, it is expected that the new connectivity would be formed, and be ready to use because all network nodes would announce their respective connectivity to the new DIS, and vice versa from the DIS (in the pseudo-node LSP). At this juncture, the older information can be withdrawn gracefully. If the OTV-IS-IS Hello messages are propagating through a high-loss network, instead of a Hello-interval, the architecture may use a Hello-timeout-interval. In such an example, the grace time window could then be a suitable factor of the previously designated time interval (e.g., 3*T1+T2 seconds).

In regards to the adjacency update process, and in the context of the Hello messaging paradigm, there can be minimal changes to existing IS-IS Hello-state machines. Each node can be configured to maintain a list of neighbor/adjacency, along with the DIS information. Once the DIS changes, if the old DIS is still reachable, then for the grace time interval, nodes can announce connectivity to both the old and the new DIS's pseudo-node LSP.

In regards to the LSP generation process, for the nodes that are not the new DIS, the only change could be to announce the connectivity to both the old and the new pseudo-node LSP for the grace period (e.g., using normal reachability rules). For the old DIS, it should withdraw/purge the pseudo-node LSP after the grace time interval expires. During this grace time interval, it should only announce the reachable members. This ensures that if nodes were lost during this grace window, they would not be picked up as being reachable during the SPF execution. The nodes can use the list of adjacency/neighbor information for this process.

For the actual SPF activities, and in the context of the previous example, this implies that as the nodes detect the new node C (that would be the DIS), a parallel LAN is created in terms of SPF. As long as connectivity to the end nodes is available via the original node A's pseudo-node LSP, or the new node C's pseudo-node LSP, the SPF output would maintain the routes (and traffic will not be disrupted). Hence, no changes would be required from an SPF perspective in certain implementations of the present disclosure. In terms of having the original LAN information and the new LAN information coexisting at the same time, this would have no implications for the end results of the SPF process. One minor change might be to seed the SPF model with multiple pseudo-node LSPs on the same interface. Normal SPF rules would progress after this activity has been completed. Note that the technique(s) described above are equally applicable to L3 IS-IS, where nodes on a LAN would follow the strategies described above. Before turning to additional capabilities and features of the present disclosure, the infrastructure of FIG. 1 is discussed.

Returning to FIG. 1, nodes 12, 14, 16, and 18 are network nodes (e.g., edge devices, routers, gateways, etc.) that can be configured for exchanging network data. Nodes 12, 14, 16, and 18 can also be configured to react to the contents, the payloads, and/or the headers of packets exchanged in a network environment. Nodes 12, 14, 16, and 18 are network nodes that are meant to encompass network appliances, servers, routers, switches, gateways, bridges, loadbalancers, firewalls, processors, edge devices, modules, or any other suitable device, component, element, or object operable to exchange information in a network environment. Moreover, the network nodes may include any suitable hardware, software, components, modules, interfaces, or objects that facilitate the operations thereof. This may be inclusive of appropriate algorithms and communication protocols that allow for the effective exchange of data or information.

Each of nodes 12, 14, 16, and 18 can execute the IS-IS protocol during their operations. From a high level, IS-IS operates as follows. First, nodes 12, 14, 16, and 18 (e.g., routers) running IS-IS send Hello packets from IS-IS-enabled interfaces to discover neighbors and to establish adjacencies. Nodes 12, 14, 16, and 18 sharing a common data link will become IS-IS neighbors if their Hello packets contain information that meets the criteria for forming an adjacency. The criteria differ slightly depending on the type of media being used (e.g., p2p, broadcast, etc.). The main criteria can include matching authentication, IS-type, MTU size, etc. Routers may build a link-state packet based on their local interfaces that are configured for IS-IS and prefixes learned from other adjacent routers. Generally, routers flood LSPs to all adjacent neighbors except the neighbor from which they received the same LSP. However, there are different forms of flooding, and also a number of scenarios in which the flooding operations may differ. Routers can construct their link-state database from these LSPs. A shortest-path tree (SPT) is calculated by each IS, and from this SPT, the routing table can be constructed. The routing table, the link state database, and any other suitable routing information may be stored in memory elements 32*a-d* of nodes 12, 14, 16, and 18 (as depicted in FIG. 2).

For adjacency building, neighbors on point-to-point networks become adjacent unless they do not see themselves in their neighbors' Hello PDU (and match on certain parameters). On broadcast networks and non-broadcast multi-access (NBMA) networks, the DIS can become adjacent with its neighbors. In most instances, routers will become neighbors if the following parameters are agreed upon: 1) Level 1, where the two routers sharing a common network segment have their interfaces configured to be in the same area to achieve a Level 1 adjacency; and 2) Level 2, where two routers sharing a common network segment are configured as Level 2 if they are in different areas and seek to become neighbors.

Network 22 represents a series of points or nodes of interconnected communication paths for receiving and transmitting packets of information that propagate through communication system 10. Network 22 offers a communicative interface between any of the components of FIG. 1 and remote sites and/or devices, and may be any local area network (LAN), wireless local area network (WLAN), metropolitan area network (MAN), wide area network (WAN), virtual private network (VPN), Intranet, Extranet, or any other appropriate architecture or system that facilitates communications in a network environment. Network 36 may implement a UDP/IP connection and use a TCP/IP communication language protocol in particular embodiments of the present disclosure. However, network 22 may alternatively implement any other suitable communication protocol for transmitting and receiving data packets within communication system 10.

Figure 2:
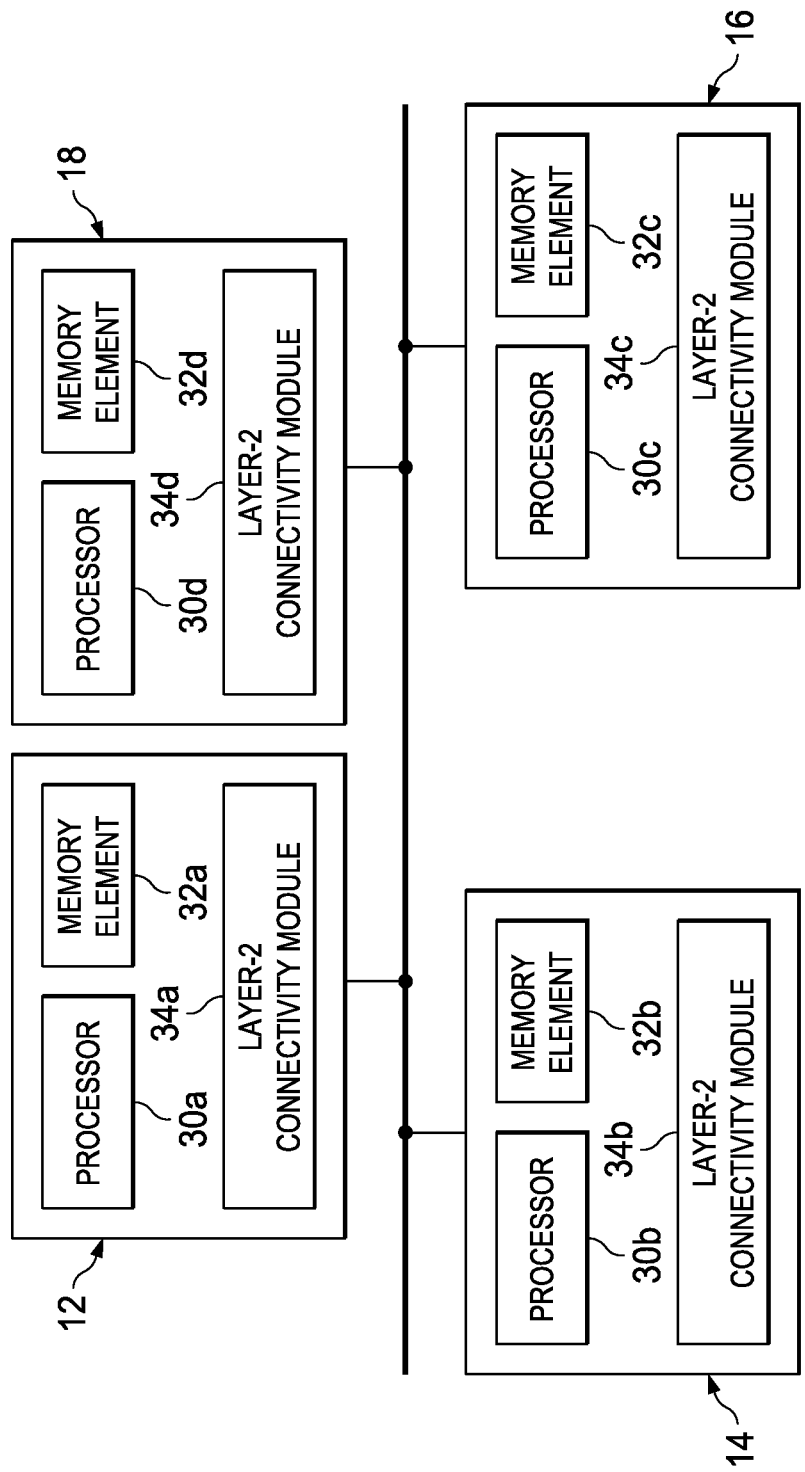
FIG. 2 is a simplified block diagram illustrating additional details associated with one potential embodiment of the communication system.

Referring now to FIG. 2, FIG. 2 is a simplified block diagram illustrating potential details associated with communication system 10. In this particular example, nodes A-D are provisioned with respective processors 30a-d, memory elements 32a-d, and layer-2 connectivity modules 34a-d. In existing systems, upon discovering that the DIS has moved (for example from node A to node D), adjacent nodes immediately eliminate their connectivity from the old DIS, and establish connectivity to the new DIS. In contrast to these operations, layer-2 connectivity modules 34a-d are configured to maintain connectivity to the old DIS for a configurable period of time, while establishing connectivity to the new DIS. At least in the generic sense, a make-before-break mechanism is being implemented in communication system 10, as detailed below with respect to FIGS. 3A-C.

In one example implementation, each of nodes 12, 14, 16, and 18 include software (e.g., as part of layer-2 connectivity modules 34a-b, etc.) to achieve, or to foster, the connectivity operations, as outlined herein. In other embodiments, this feature may be provided externally to these elements, or included in some other network device to achieve this intended functionality. Alternatively, these elements can include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Hence, appropriate software and/or hardware can be provisioned in nodes 12, 14, 16, and 18 in order to facilitate the connectivity features discussed herein. A single instance of the enhanced node may be provisioned in a given network scenario (e.g., at a network edge) to achieve the teachings of the present disclosure, or multiple instances of this element may be provisioned based on the particular use case. Alternatively, such a mechanism can be provisioned in any other element in a network environment. Such provisioning may be based on particular operator constraints, particular networking environments, specific types of data, particular types of hardware/software, and/or specific protocol parameters. Note that in certain examples, certain databases can be consolidated with memory elements (or vice versa), or the storage mechanisms of the present disclosure can overlap/exist in any other suitable manner.

In regards to the internal structure associated with communication system 10, each of nodes 12, 14, 16, and 18 can include memory elements for storing information to be used in achieving the connectivity operations, as outlined herein. Additionally, each of these devices may include a processor that can execute software or an algorithm to perform the connectivity activities discussed herein. These devices may further keep information in any suitable memory element [(e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element.' The information being tracked or sent by nodes 12, 14, 16, and 18 could be provided in any database, queue, register, control list, or storage structure, all of which can be referenced at any suitable timeframe. Any such storage options may be included within the broad term 'memory element' as used herein. Similarly, any of the potential processing elements, modules, and machines described herein should be construed as being encompassed within the broad term 'processor.' Each of the network nodes can also include suitable interfaces for receiving, transmitting, and/or otherwise communicating data or information in a network environment.

Note that in certain example implementations, the connectivity functions outlined herein may be implemented by logic encoded in one or more tangible media (e.g., embedded logic provided in an ASIC, in DSP instructions, software [potentially inclusive of object code and source code] to be executed by a processor, or other similar machine, etc.). In some of these instances, memory elements [as shown in FIG. 2] can store data used for the operations described herein. This includes the memory elements being able to store software, logic, code, or processor instructions that are executed to carry out the activities described herein. A processor can execute any type of instructions associated with the data to achieve the operations detailed herein. In one example, the processors [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Figure 3A:
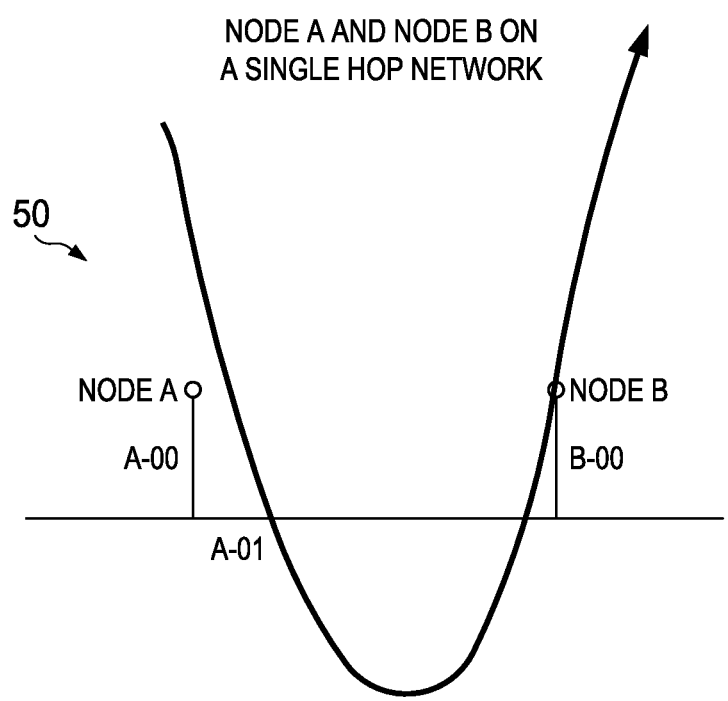
FIGS. 3A-3C are simplified schematic diagrams illustrating example migration activities associated with the communication system.
Figure 3B:
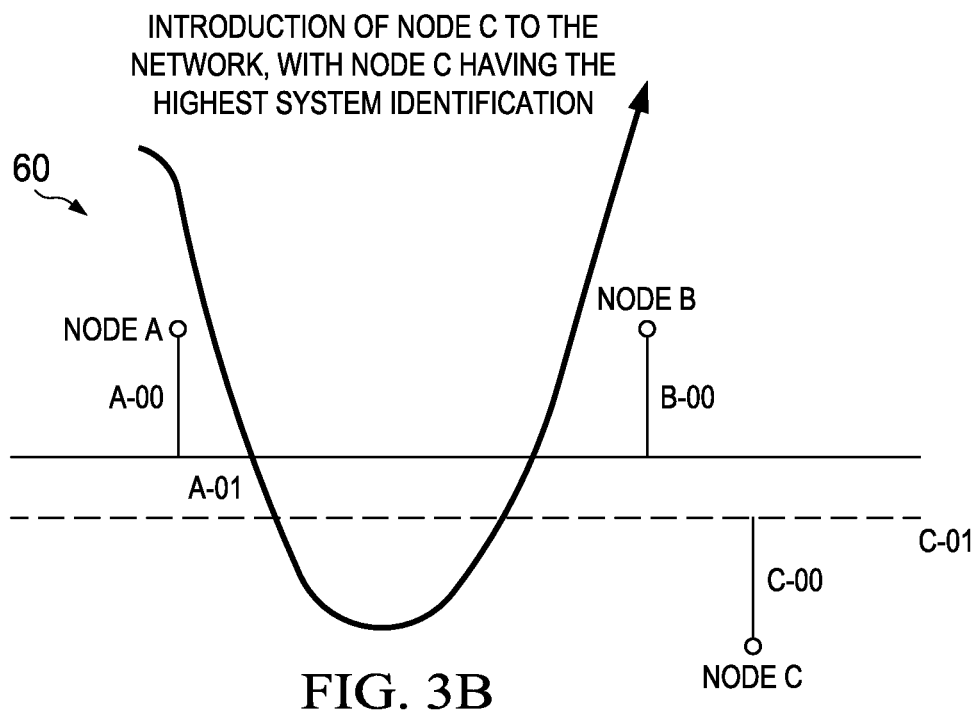
Figure 3C:
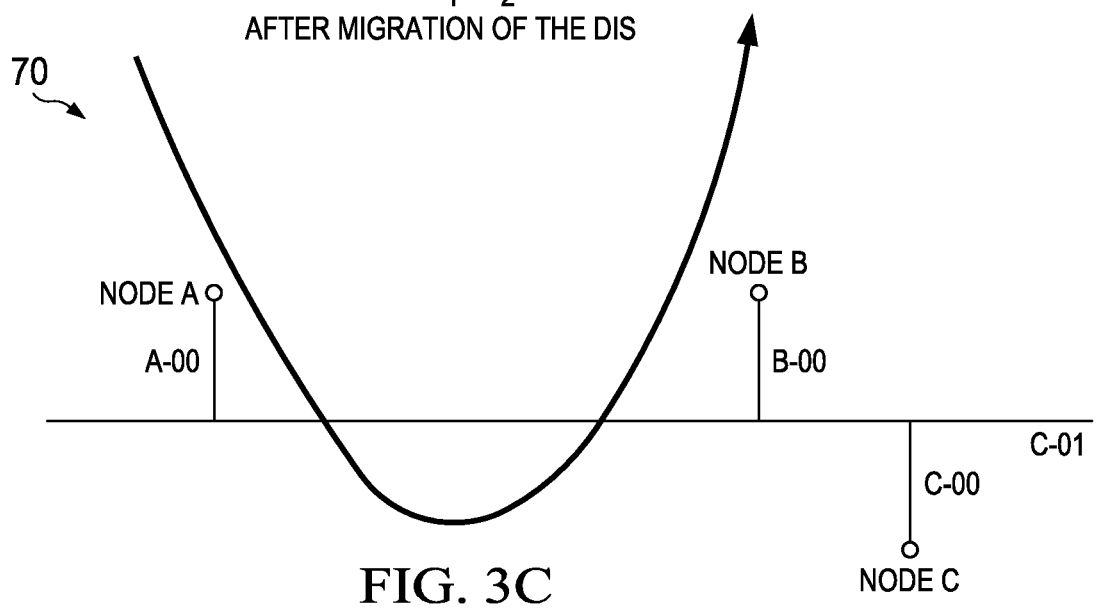
Figure 4:
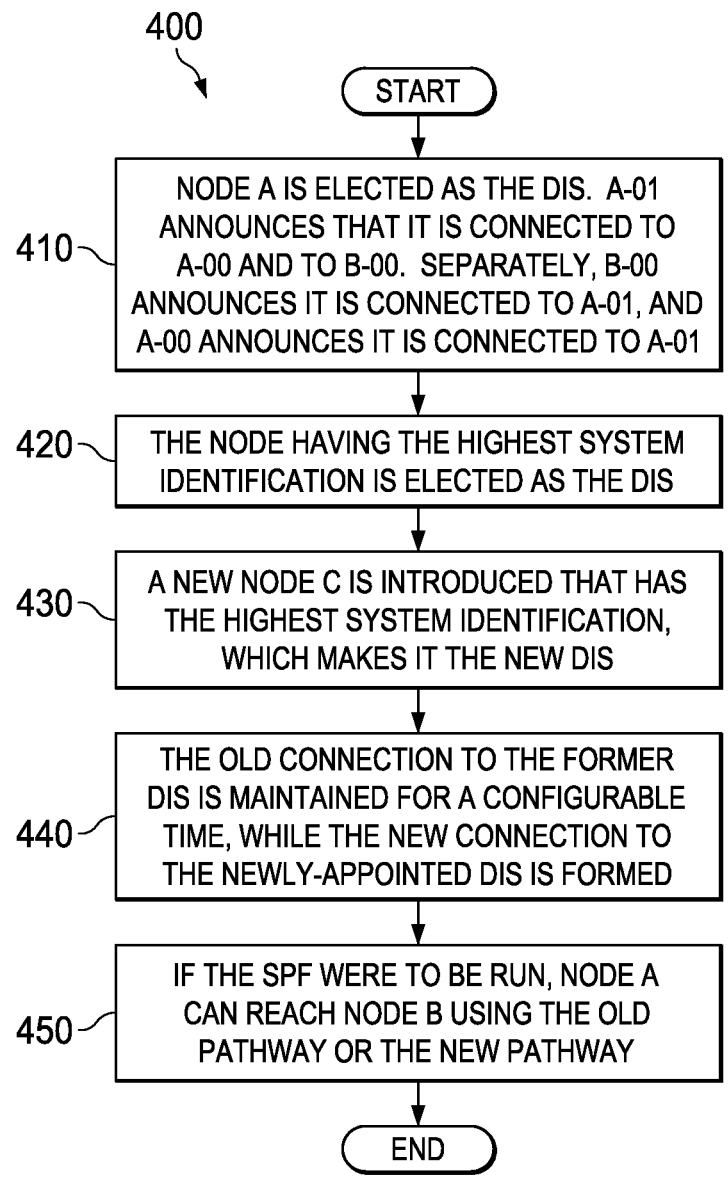
FIG. 4 is a simplified flowchart illustrating one possible operational flow associated with the communication system.

FIGS. 3A-3C are simplified schematic diagrams illustrating a series of migration activities 50, 60, and 70, as discussed herein. FIG. 4 is a simplified flowchart 400 that tracks the operational aspects of FIGS. 3A-3C and, therefore, these FIGURES are discussed together. More specifically, FIG. 3A is illustrating two nodes (node A and node B) operating in a single hop LAN, where IS-IS is being used as the IGP. Stated in different terminology, node A and node B are connected via the LAN, while A-01 is representative of the PSTN node, where node A has ownership. Hence, in this particular example, node A is elected as the DIS. A-01 announces that it is connected to A-00 and to B-00, and separately B-00 announces it is connected to A-01, and A-00 announces it is connected to A-01. This is reflected by 410 of FIG. 4. There are three LSPs in this particular implementation; however, any number of LSPs could be provisioned in such a scenario. The node having the highest system ID is elected as the DIS, which is reflected by 420 of FIG. 4. The system ID can be any suitable identifier such as a six-byte value representative of the backplane MAC address. Each node has a unique system ID such that when each node is introduced into the network (e.g., via Hello messaging amongst the nodes), a DIS election is made in order to represent other nodes in the LAN.

FIG. 3B illustrates the introduction of a new node C that has the highest system ID, which makes it the new DIS according to provisioned rules. This is reflected at 430 of FIG. 4. Recall that node A was previously elected as the DIS. Because node C is now operating as the DIS, it creates C-01 (the dashed line of FIG. 3B), where corresponding connectivity is maintained between A-00 and B-00. Hence, from this depiction, a small window exists in which the pseudo-node LSP (that holds the connectivity information) may not have the entire connectivity map for the LAN. This missing piece can result in traffic loss. The mechanisms of communication system 10 effectively preserve these existing traffic flows in the control plane.

In a general sense, FIG. 3B is illustrating a make-before-break mechanism in which the old connection to the former DIS is maintained for a configurable time, while the new connection to the newly appointed DIS is formed. This is also being depicted in 440 of FIG. 4. This allows for a seamless transition of the DIS, where network traffic is not disrupted. Hence, B-00 is still connected to A-01, and it forms a new connection to C-01. Note that because there are separate nodes involved in this interactions being discussed, the connectivity can form at different times. However, at any specific time interval, if the SPF operations were to be run, node A can still reach node B: either using the solid line or the dashed line, as shown in the FIGURES. This is being shown at 450 of FIG. 4, where node A can reach node B using the old pathway or the new pathway being created.

FIG. 3C is illustrating the resultant after the new connection to the newly appointed DIS is formed. Once the previous process of FIG. 3B has been completed, the old solid line would be eliminated and the dashed line would remain as a new solid line. Stated in make-before-break terminology, the previous dashed line would be solidified before the original solid line is removed from the architecture.

Note that with the examples provided above, as well as numerous other examples provided herein, interaction may be described in terms of two, three, or four network nodes. However, this has been done for purposes of clarity and example only. In certain cases, it may be easier to describe one or more of the functionalities of a given set of flows by only referencing a limited number of network nodes. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

Additionally, although described with reference to particular scenarios, where a connectivity module is provided within the network nodes, these modules can be provided externally, or consolidated and/or combined in any suitable fashion. In certain instances, the connectivity module may be provided in a single proprietary element, device, unit, etc. Additionally, the teachings of the present disclosure are not simply applicable to video processing contexts. Instead, communication system 10 can readily be used by any protocol in which certain types of processing is being performed along a given network pathway. Moreover, the teachings of the present disclosure are readily applicable to legacy systems, long-term evolution (LTE) configurations, or any other suitable architecture in which similar connectivity scenarios would be present.

Additionally, communication system 10 can be applicable to any type of point-to-point networks (e.g., such as serial lines that connect a single pair of routers), broadcast networks (e.g., such as Ethernet, Token Ring, and Fiber Distributed Data Interface (FDDI)), non-broadcast multi-access (NBMA) networks (e.g., such as Frame Relay, Asynchronous Transfer Mode (ATM), and X.25), etc.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   establishing a communication pathway between a first network node and a second network node coupled to a network;
   forming an adjacency to a new network node coupled to the network, wherein a designated intermediate system (DIS) election operation is executed after the adjacency is formed in order to determine that the new network node is a newly identified DIS for the network; and
   communicating a message advertising connectivity via both a previously identified DIS and the newly identified DIS, wherein the message is communicated during a specified time interval.

2. The method of claim 1, wherein the first network node is configured to execute a shortest path first (SPF) operation in order to reach both the previously identified DIS and the newly identified DIS.

3. The method of claim 1, wherein the first network node synchronizes to a link state database associated with the newly identified DIS.

4. The method of claim 1, wherein the newly identified DIS purges a pseudo-node link state protocol data unit (LSP) and generates its own LSP.

5. The method of claim 1, wherein after the specified time interval, the first network node advertises connectivity only to the newly identified DIS.

6. The method of claim 1, wherein the time interval is based on a hello message parameter and a communication parameter, which is associated with interacting with all nodes coupled to a local area network (LAN).

7. The method of claim 6, wherein the time interval is factored based on a high-loss characteristic of the network.

8. The method of claim 1, wherein the network is an overlay transport virtualization (OTV) LAN network in which the first network node executes an intermediate system to intermediate system (IS-IS) protocol in a control plane.

9. Logic encoded in non-transitory media that includes code for execution and when executed by a processor operable to perform operations comprising:

establishing a communication pathway between a first network node and a second network node coupled to a network;

forming an adjacency to a new network node coupled to the network, wherein a designated intermediate system (DIS) election operation is executed after the adjacency is formed in order to determine that the new network node is a newly identified DIS for the network; and communicating a message advertising connectivity via both a previously identified DIS and the newly identified DIS, wherein the message is communicated during a specified time interval.

10. The logic of claim 9, wherein the first network node is configured to execute a shortest path first (SPF) operation in order to reach both the previously identified DIS and the newly identified DIS.

11. The logic of claim 9, wherein the first network node synchronizes to a link state database associated with the newly identified DIS.

12. The logic of claim 9, wherein the newly identified DIS purges a pseudo-node link state protocol data unit (LSP) and generates its own LSP.

13. The logic of claim 9, wherein after the specified time interval, the first network node advertises connectivity only to the newly identified DIS.

14. The logic of claim 9, wherein the time interval is based on a hello message parameter and a communication parameter, which is associated with interacting with all nodes coupled to a local area network (LAN), and wherein the time interval is factored based on a high-loss characteristic of the network.

15. An apparatus, comprising:
a memory element configured to store electronic code;
a processor operable to execute instructions associated with the electronic code; and
a connectivity module configured to interface with the processor such that the apparatus is configured for:
establishing a communication pathway between a first network node and a second network node coupled to a network;

forming an adjacency to a new network node coupled to the network, wherein a designated intermediate system (DIS) election operation is executed after the adjacency is formed in order to determine that the new network node is a newly identified DIS for the network; and communicating a message advertising connectivity via both a previously identified DIS and the newly identified DIS, wherein the message is communicated during a specified time interval.

16. The apparatus of claim 15, wherein the first network node is configured to execute a shortest path first (SPF) operation in order to reach both the previously identified DIS and the newly identified DIS.

17. The apparatus of claim 15, wherein the first network node synchronizes to a link state database associated with the newly identified DIS.

18. The apparatus of claim 15, wherein the newly identified DIS purges a pseudo-node link state protocol data unit (LSP) and generates its own LSP.

19. The apparatus of claim 15, wherein after the specified time interval, the first network node advertises connectivity only to the newly identified DIS.

20. The apparatus of claim 15, wherein the time interval is based on a hello message parameter and a communication parameter, which is associated with interacting with all nodes coupled to a local area network (LAN), and wherein the time interval is factored based on a high-loss characteristic of the network.

* * * * *